(12) United States Patent
Thirumalai et al.

(10) Patent No.: US 9,608,945 B2
(45) Date of Patent: Mar. 28, 2017

(54) SENDING MESSAGES TO MULTIPLE RECEIVING ELECTRONIC DEVICES USING A MESSAGE SERVER

(71) Applicant: Apple Inc., Cupertino, CA (US)

(72) Inventors: Gokul P. Thirumalai, Mountain View, CA (US); Justin M. N. Wood, Sunnyvale, CA (US); Roberto Garcia, Jr., Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/586,470

(22) Filed: Dec. 30, 2014

(65) Prior Publication Data

US 2015/0350119 A1   Dec. 3, 2015

Related U.S. Application Data

(60) Provisional application No. 62/005,767, filed on May 30, 2014.

(51) Int. Cl.

| H04L 29/00 | (2006.01) |
|---|---|
| H04L 12/58 | (2006.01) |
| H04L 29/08 | (2006.01) |
| H04L 29/06 | (2006.01) |
| H04L 9/08 | (2006.01) |
| H04L 12/18 | (2006.01) |

(52) U.S. Cl.
CPC ............ *H04L 51/04* (2013.01); *H04L 9/0816* (2013.01); *H04L 12/1859* (2013.01); *H04L 63/0428* (2013.01); *H04L 67/146* (2013.01); *H04L 67/26* (2013.01)

(58) Field of Classification Search
CPC ..... H04L 51/04; H04L 67/26; H04L 63/0428; H04L 9/0816; H04L 63/04281; H04L 63/08; H04L 9/00
See application file for complete search history.

(56) References Cited

U.S. PATENT DOCUMENTS

| 2005/0138369 A1* | 6/2005 | Lebovitz ............... H04L 12/185 713/163 |
|---|---|---|
| 2009/0059831 A1* | 3/2009 | Li ........................ H04W 72/005 370/312 |
| 2012/0117250 A1* | 5/2012 | Santamaria ........... H04L 61/256 709/227 |

* cited by examiner

*Primary Examiner* — Brandon Hoffman
*Assistant Examiner* — Helai Salehi
(74) *Attorney, Agent, or Firm* — Chia-Hsin Chu; Page Ponsford; DLA Piper LLP US

(57) ABSTRACT

The described embodiments include a message server that is configured to send, to multiple receiving electronic devices, corresponding messages that each include a payload acquired from a single request message received from a client electronic device. In these embodiments, the request message received from the client electronic device includes a push token for each of the receiving electronic devices and the payload. Upon receiving the request message, the message server generates, for a receiving electronic device associated with each push token, a message that includes the payload. The message server then sends each message to the corresponding receiving electronic device. In this way, the message server "fans out," to the multiple receiving electronic devices, corresponding messages that each include the payload from the single request message.

24 Claims, 7 Drawing Sheets

SENDING MESSAGES TO MULTIPLE RECEIVING ELECTRONIC DEVICES USING A MESSAGE SERVER

RELATED APPLICATION

This application claims priority under 35 U.S.C. §119 to U.S. Provisional Application No. 62/005,767, entitled "Sending Messages to Multiple Receiving Electronic Devices Using a Message Server," by the same inventors, filed 30 May 2014, the contents of which are herein incorporated by reference in their entirety.

BACKGROUND

Field

The described embodiments relate to electronic devices. More specifically, the disclosed embodiments relate to sending messages to receiving electronic devices using a message server.

Related Art

Some modern electronic devices (smart phones, laptop computers, etc.) include a message application that users can use to send messages to electronic devices for other users (i.e., to the message application on the electronic devices for the other users). For example, these electronic devices may include a message application such as the Messages application from Apple Inc. of Cupertino, Calif. that enables users to send messages with text, photos, video, documents, contacts, etc. to other users. Some message applications support group messaging, meaning that a user can use the message application to simultaneously send a message to electronic devices for a group of two or more other users.

Generally, when a user sends a message to another user, the user provides, to the message application on a sending electronic device, a handle for the other user and a payload of the message. For example, the user can provide a handle such as an email address, a phone number, and/or another piece of information that can be used to identify the user or an account for the user, and a payload such as text, one or more photos, etc. The sending electronic device then sends a request to an identity server for an identification of electronic devices associated with the handle (i.e., each of the other user's electronic devices). The identity server uses the handle to look up electronic devices associated with the handle and returns, for each of one or more electronic devices associated with the handle, a corresponding push token and session token. Next, the sending electronic device generates a separate request message for each of the other user's electronic devices, each request message including a corresponding one of the returned push tokens and the corresponding session token, as well as the payload. The sending electronic device then separately sends each of the request messages to a message server to be forwarded to the corresponding one of the other user's electronic devices. The message server, for each received request message, verifies, using the session token, that the sending electronic device is permitted to send messages to the corresponding one of the other user's electronic devices. The message server then uses the push token to locate the corresponding one of the other user's electronic devices and sends a message including the payload to the corresponding one of the other user's electronic devices.

When a user sends a group message, the user provides, to the message application on a sending electronic device, two or more handles for the other users (i.e., handles for each user in a group of users) and a payload of the message. The above-described process is then performed for each of the handles. Thus, the sending electronic device sends, to the message server, a separate message for each electronic device associated with the each of the handles. Because each handle may be associated with multiple electronic devices (e.g., a user's laptop, smart phone, tablet computer, set top box, etc.), multiple separate messages may be sent from the sending electronic device to the message server when sending a group message.

Because there are many users using electronic devices that provide the message application, and sending a message to each electronic device associated with a handle (or a group of handles) is performed using the message server as described above, a very large number of messages are received by message server(s). This necessitates the provision of large numbers of highly-available message servers and places considerable loads on the message servers.

In addition, some of the message applications encrypt messages separately for each receiving electronic device. Thus, the sending device has a separate encryption key for each electronic device associated with a handle to which messages are to be sent, and each electronic device associated with a handle to which messages are to be sent has a corresponding decryption key. Because, as described above, each handle may be associated with multiple electronic devices and group messages may be sent to multiple handles, multiple separate messages may need to be encrypted by the sending electronic device to generate corresponding requests to the message server. This places an appreciable computational load on sending electronic devices.

BRIEF DESCRIPTION OF THE FIGURES

In the figures, like reference numerals refer to the same figure elements.

DETAILED DESCRIPTION

Figure 1:
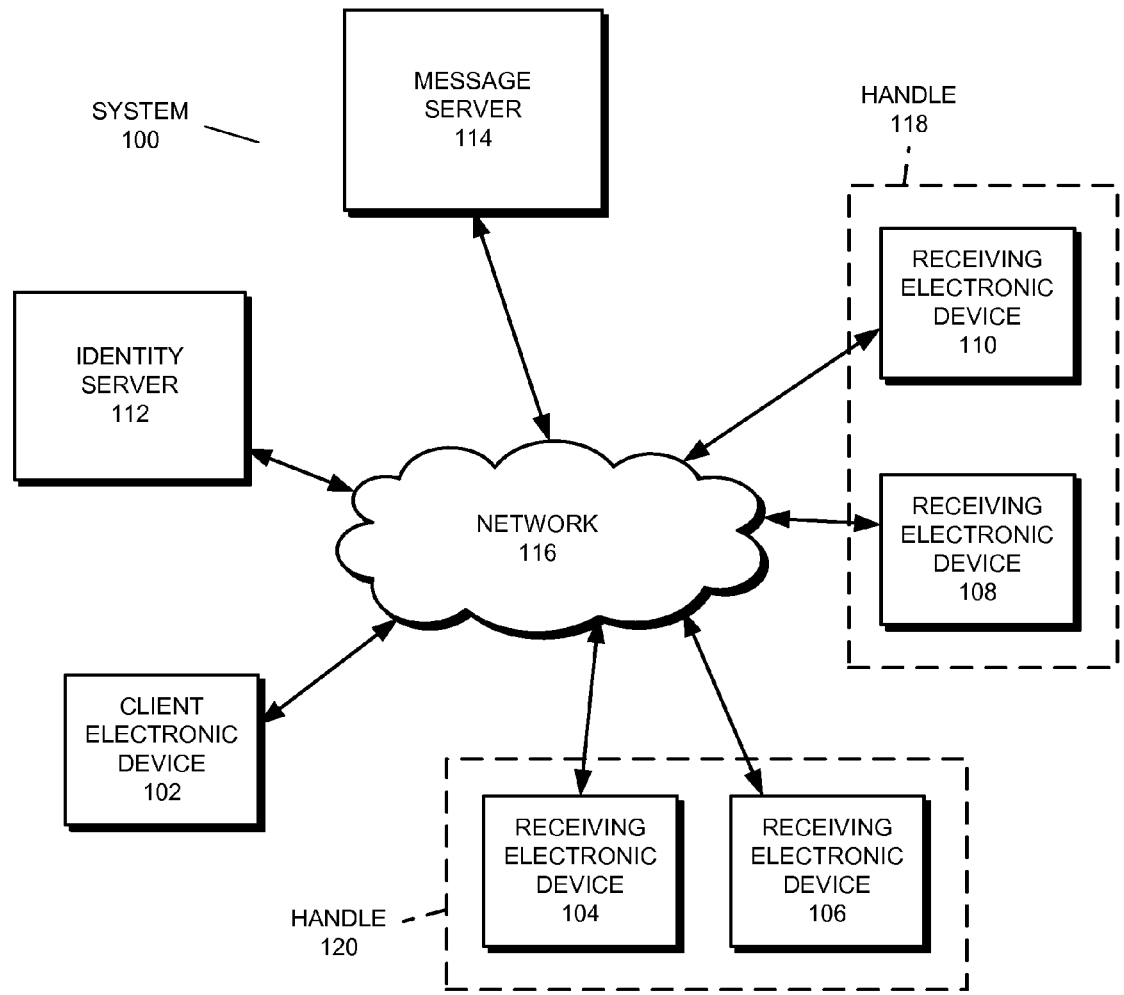
FIG. 1 presents a block diagram illustrating a system in accordance with some embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

In some embodiments, a computing device (e.g., client electronic device 102 (see FIG. 1), receiving electronic devices 104-110, message server 114, etc. and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations. A computer-readable storage medium can be any device or medium or combination thereof that stores code and/or data for use by a computing device. For example, the computer-readable storage medium can include, but is not limited to, volatile memory or non-volatile memory, including flash memory, random access memory (RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations. In some embodiments, one or all of the hardware modules is included in a computing device such as client electronic device 102, receiving electronic devices 104-110, message server 114, etc.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Handles: handles are identifiers for users or user accounts that are used for keeping and/or accessing records of information associated with the users or user accounts. For example, in some embodiments, handles are used for keeping and/or accessing records of electronic devices associated with corresponding users or user accounts. As another example, in some embodiments, handles are included in communications sent from a sending electronic device to a receiving electronic device to specify users or user accounts to which the communications apply. For example, in some embodiments, a client electronic device includes one or more handles in device information request messages requesting push tokens for electronic devices associated with the corresponding users or user accounts. A handle can be any value (string, etc.) that can be used to identify users or user accounts, such as account identifiers, login names, user's names, email addresses, phone numbers, etc.

Messages: messages include data sent between electronic devices in accordance with protocols such as the short messaging service (SMS) protocol, the multimedia messaging service (MMS) protocol, the iMessage protocol from Apple Inc. of Cupertino, Calif., and/or other protocols. Depending on the requirements of the particular protocol, messages may include payloads (i.e., content) such as text, photos, video, documents, contacts, and/or other electronically-encoded data. As described herein, in some embodiments, messages (e.g., payloads, etc.) are encrypted.

Overview

The described embodiments include a message server that is configured to send, to multiple receiving electronic devices, separate messages that each include a payload acquired from a single request message received from a client electronic device. In these embodiments, the request message received from the client electronic device includes a push token for each of the receiving electronic devices and the payload. Upon receiving the request message, the message server generates, for a receiving electronic device associated with each push token, a message that includes the payload. The message server then sends each message to the corresponding receiving electronic device. In this way, the message server "fans out," to the multiple receiving electronic devices, corresponding messages that each include the payload from the single request message.

In the described embodiments, each of the receiving electronic devices is associated with a corresponding handle. For example, each receiving electronic device may belong to or be assigned to a user and therefore be associated with a handle such as a user account identifier, a user phone number, etc. In some cases, two or more of the receiving electronic devices are associated with the same handle. For example, the two or more receiving electronic devices may belong to or be assigned to the same user and therefore be associated with the same handle such as a user account identifier, a user phone number, etc. In some embodiments, before sending the above-described request message, the client electronic device acquires the push token for each of the receiving electronic devices based on a corresponding handle. In these embodiments, the client electronic device sends, to an identity server, a request that identifies one or more handles to which a message is to be sent. The identity server then returns a response message that includes a push token for each device associated with the handle. In some cases, multiple push tokens are returned by the identity server for a given handle, one for each electronic device associated with the given handle.

In some embodiments, along with the above-described push tokens, the identity server returns a single session token. In these embodiments, the client electronic device includes the session token in the above-described request message to the message server. The session token is then used by the message server to verify that the client electronic device is permitted to send messages to each/all of the receiving electronic devices associated with the push tokens via the message server.

In some embodiments, the client electronic device uses a single encryption key to encrypt the payload before including the payload in the above-described request message. In these embodiments, the client electronic device previously negotiated the encryption key with each of the receiving electronic devices. Thus, each of the receiving electronic devices has a corresponding decryption key that can be used to decrypt the encrypted payload in the corresponding message received from the message server.

By including multiple push tokens and the single session token in the single request message and having the message server send (fan out) corresponding messages to the receiving electronic devices, the described embodiments send less request messages to the message server than existing systems that send a separate request message to the message server for each push token and corresponding session token. In addition, by using the single encryption key to encrypt the payload in the request message as described, the described embodiments reduce the computational load for generating the request message and reduce the size of the request message in comparison to existing systems that use separate encryption keys for each receiving device to generate a corresponding encrypted payload for each receiving device. In this way, the described embodiments can reduce loads on the client electronic device, the message server, and a network through which the client electronic device and message server communicate.

System

FIG. 1 presents a block diagram illustrating a system 100 in accordance with some embodiments. As can be seen in FIG. 1, system 100 includes client electronic device 102, receiving electronic devices 104-110, identity server 112, message server 114, and network 116. Generally, system 100 is configured to enable client electronic device 102 to send messages to receiving electronic devices 104-110 via message server 114 as described herein.

Client electronic device 102 is an electronic device that sends messages to receiving electronic devices 104-110 via message server 114 using push tokens and other information acquired from identity server 112. Client electronic device 102 also negotiates a single encryption key with each of receiving electronic devices 104-110 and uses the single encryption key to encrypt payloads of messages destined for each of receiving electronic device 104-110. Client electronic device 102 may be, for example, a smart phone, a desktop computer, a laptop computer, a tablet computer, a network-attached storage device, an automobile interface, a media device (set-top box, media player, etc.), a server computer, a television, a wearable computing device, a networking device, and/or another electronic device.

Receiving electronic devices 104-110 are electronic devices that receive messages from client electronic device 102 via message server 114. Each of receiving electronic devices 104-110 also negotiates a decryption key with client electronic device 102 and uses the decryption key to decrypt payloads of messages that were encrypted by client electronic device 102. Receiving electronic devices 104-110 may be, for example, smart phones, desktop computers, laptop computers, tablet computers, network-attached storage devices, automobile interfaces, media devices (set-top boxes, media players, etc.), server computers, televisions, wearable computing devices, networking devices, and/or other electronic devices. In some embodiments, one or more of receiving electronic devices 104-110 are different types of electronic device than others of receiving electronic devices 104-110.

Identity server 112 is an electronic device that provides services related to acquiring information relating to users and/or user accounts. For example, in some embodiments, client electronic device 102 sends device information request messages to identity server 112 to acquire, from identity server 112, push tokens and a session token for on one or more handles to enable the transmission of messages to corresponding electronic devices. Identity server 112 may be, for example, a desktop computer, a laptop computer, a network-attached storage device, a server computer, a networking device, and/or another electronic device or devices.

Message server 114 is an electronic device that provides services related to sending messages to one or more electronic devices. For example, message server 114 can send messages to one or more of receiving electronic devices 104-110 based on a request message received from client electronic device 102. In some embodiments, as described above, message server 114 receives a single request message from client electronic device 102 that includes two or more push tokens for two or more of receiving electronic devices 104-110, a single session token, and a payload. After verifying, using the session token, that client electronic device 102 is permitted to send messages to the two or more of receiving electronic devices 104-110, message server 114 generates a corresponding message for each of the two or more of receiving electronic devices 104-110, each of which includes a copy of the payload from the request message, and sends the corresponding message to the two or more of receiving electronic devices 104-110 based on the push tokens.

Network 116 is a communication network with signal routes (electrical wires/cables, optical wires/cables, radio waves, etc.) and network appliances (routers, switches, etc.) that are used for communicating between devices that are communicatively coupled to network 116. In some embodiments, network 116 is or includes the Internet.

Handles 118 and 120 are generally identifiers for users or user accounts, etc. For example, handle 118 may be an identifier such as an email address "queen@website.com" or a username "brandon17." As another example, handle 120 may be an identifier such as phone number "925-555-1212." As shown in FIG. 1, certain receiving electronic devices are associated with corresponding handles. In these embodiments, the receiving electronic devices may belong to, be assigned to, or otherwise be associated with users or user accounts identified by the handles. As can be seen, receiving electronic devices 108-110 (e.g., a user's tablet computer and a smart phone) are associated with handle 118 and receiving electronic devices 104-106 (e.g., a user's laptop computer and smart phone) are associated with handle 120. As described herein, these handles are used by identity server 112 to keep and access records of push tokens for the electronic devices and for performing other operations.

Although system 100 is shown with a particular arrangement of devices, in some embodiments, system 100 includes different devices and/or a different arrangement of devices. For example, in some embodiments, system 100 may include more or fewer receiving electronic devices. As another example, in some embodiments, the receiving electronic devices may be associated with different handles. Generally, system 100 includes sufficient devices to perform the operations herein described.

Process for Negotiating an Encryption Key

Figure 2:
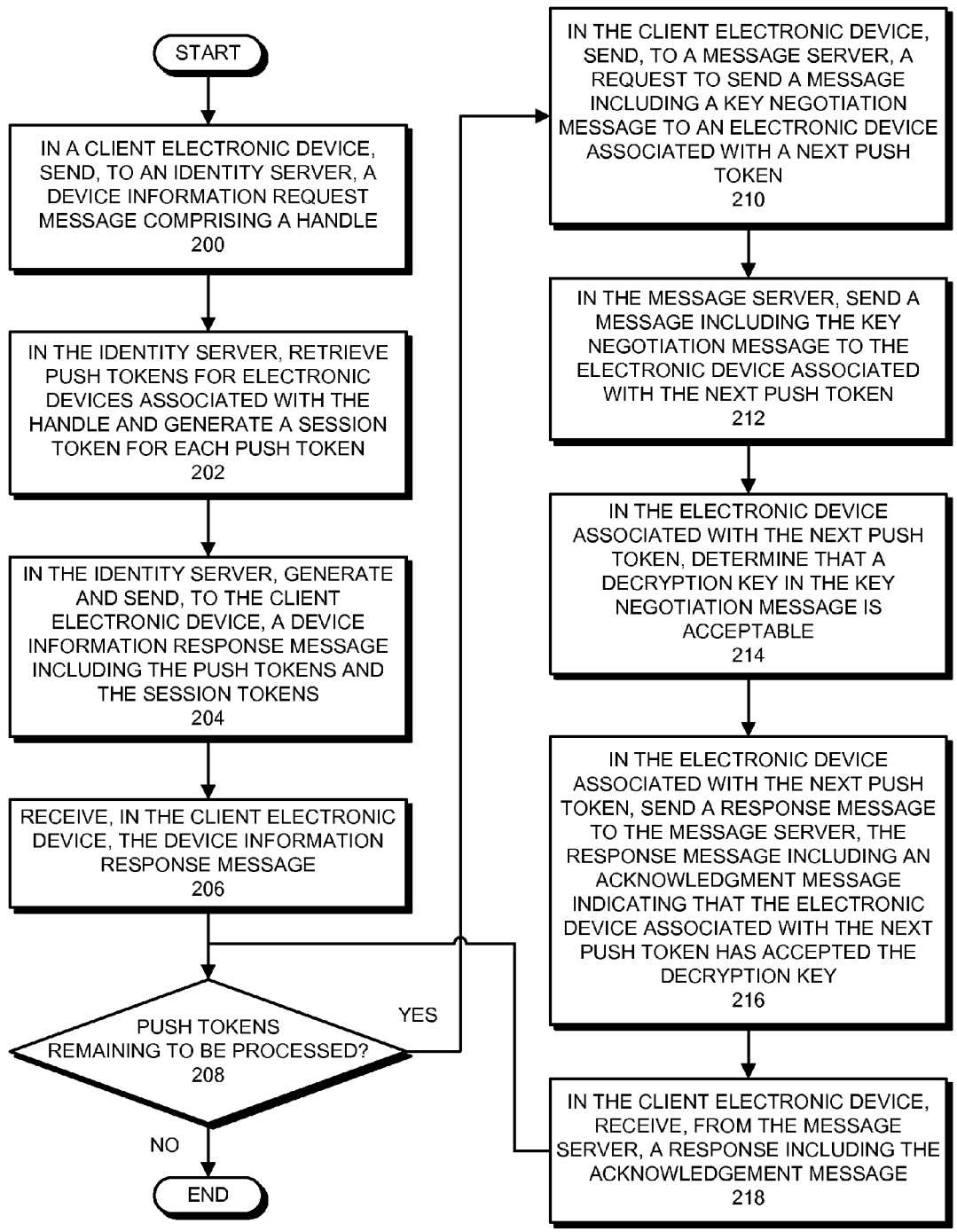
FIG. 2 presents a flowchart illustrating a process for negotiating an encryption key in accordance with some embodiments.

In some embodiments, client electronic device 102 negotiates, with other electronic devices, an encryption key that is to be used to encrypt messages that are sent to the other electronic devices. FIG. 2 presents a flowchart illustrating a process for negotiating an encryption key in accordance with some embodiments. More specifically, during the process shown in FIG. 2, client electronic device 102 negotiates, via message server 114, with receiving electronic devices 108-110, an encryption key to be used to encrypt messages to receiving electronic devices 108-110. Note that the operations shown in FIG. 2 are presented as a general example of operations performed by some embodiments. The operations performed by other embodiments include different operations and/or operations that are performed in a different order. Additionally, although certain mechanisms are used in describing the operations (e.g., client electronic device 102, message server 114, etc.), in some embodiments, other electronic devices perform the operations. Generally, the described embodiments include sufficient electronic devices to perform the operations herein described.

In describing the negotiation of encryption keys in FIG. 2, only a single handle is described—handle 118. Thus, the negotiation is made only with electronic devices associated with handle 118 (i.e., receiving electronic devices 108-110). However, it is assumed that a similar negotiation takes place using handle 120, which is associated with receiving electronic device 104-106. Thus, all of receiving electronic devices 104-110 have a decryption key that is used to decrypt encrypted messages received from client electronic device 102 (i.e., that were encrypted using the single/same encryption key).

The process shown in FIG. 2 starts when client electronic device 102 sends, to identity server 112, a device information request message comprising handle 118 (step 200). In some embodiments, the device information request message is formatted in accordance with a network protocol used to communicate between client electronic device 102 and identity server 112, with fields/portions in packets/messages/etc. including handle 118 and an indication that the message is requesting information for electronic devices associated with handle 118 (i.e., a push token and a corresponding session token for each electronic device associated with handle 118).

Upon receiving the device information request message, identity server 112 acquires handle 118 from the device information request message and looks up handle 118 in a record that relates handles to associated electronic devices in identity server 112 (or in another electronic device such as a database server). The lookup returns push tokens for receiving electronic devices 108-110 (step 202). The push tokens include information identifying a corresponding one of receiving electronic devices 108-110 and enabling devices (e.g., message server 114) to find the corresponding one of receiving electronic devices 108-110 for sending messages (e.g., to route messages in a network via one or more network devices to the corresponding one of receiving electronic devices 108-110). From the push tokens and/or other information (e.g., handle 118, information about client electronic device 102, etc.), identity server 112 computes/generates a session token for each push token. Each of the session tokens includes a value that is subsequently used by message server 114 to verify that client electronic device 102 is permitted to send messages to a corresponding one of receiving electronic devices 108-110.

Identity server 112 then generates and sends to client electronic device 102 a device information response message that comprises the push token and the corresponding session token for each electronic device associated with handle 118 (step 204). In some embodiments, the device information response message is formatted in accordance with a network protocol used to communicate between client electronic device 102 and identity server 112, with fields/portions in packets/messages/etc. including the push token and the corresponding session token for each electronic device associated with handle 118 and an indication that the message is a response to a device information request message.

Client electronic device 102 next receives, from identity server 112, the device information response message (step 206). Client electronic device 102 then determines if all of the push tokens from the device information response message have been processed (step 208). If so, the negotiation has been performed with each of receiving electronic devices 108-110 and the negotiation process ends.

Otherwise, if one or more push tokens from the device information response message remain to be processed (step 208), client electronic device 102 sends, to message server 114, a request to send a message including a key negotiation message to an electronic device associated with the next push token (step 210). Client electronic device 102 includes in the request message the next push token, a corresponding session token, a corresponding handle, the key negotiation message, and an indication that the message is a request to send a corresponding message to an electronic device associated with the next push token. In some embodiments, the key negotiation message comprises a decryption key that can be used to decrypt messages encrypted by client electronic device 102 and a request that the decryption key be used to decrypt the encrypted messages. In some embodiments, the request message is formatted in accordance with a network protocol used to communicate between client electronic device 102 and message server 114, with fields/portions in packets/messages/etc. including the next push token, the corresponding session token, the corresponding handle, the key negotiation message, and the indication that the message is a request to send a corresponding message to an electronic device associated with the next push token.

Upon receiving the request message from client electronic device 102, message server 114 processes the request message, using the session token to determine if client electronic device 102 is permitted to send messages to the electronic device associated with the next push token (e.g., if client electronic device 102 is permitted to send messages to receiving electronic device 108, when the next push token is for receiving electronic device 108). For example, message server 114 may use information from the request message (e.g., the handles, the next push token, etc.) and/or other information to compute an expected value for the session token and compare the session token from request message with the expected value for the session token. In these embodiments, message server 114 determines that client electronic device 102 is permitted to send the message to the electronic device associated with the next push token when the expected value for the session token matches the session token from request message. For this example, it is assumed that there is a match.

Message server 114 then sends a message including the key negotiation message to the electronic device associated with the next push token (step 212). More specifically, message server 114 processes the next push token to determine the identity and location in the network of the electronic device associated with the next push token and then sends the message to the electronic device based on the determined identity and location.

Upon receiving the message from message server 114, the electronic device associated with the next push token processes the message, extracting the decryption key and the request to use the decryption key from client electronic device 102. Based on a determination that the encryption key is acceptable (step 214), the electronic device associated with the next push token stores the decryption key for future use. The electronic device associated with the next push token then sends a response message to message server 114 (step 216), the response message including a push token for client electronic device 102, the session token, an acknowledgement message indicating the acceptance of the decryption key, and an indication that the message is a request to send a corresponding message to an client electronic device 102. In some embodiments, the response message is formatted in accordance with a network protocol used to communicate between the electronic device associated with the next push token and message server 114, with fields/portions in packets/messages/etc. including a push token for client electronic device 102, the session token, the acknowledgement message, and the indication that the message is a request to send a corresponding message to an client electronic device 102.

Upon receiving the response message, message server 114 sends, to client electronic device 102, a response indicating that the electronic device associated with the next push token has accepted the decryption key from the key negotiation message (step 218). Upon receiving and processing the response, client electronic device 102 is configured to use the corresponding encryption key to encrypt messages (e.g., payloads for messages, etc.) to the electronic device associated with the next push token.

Next, client electronic device 102 returns to step 204 to determine if all of the returned push tokens have been processed (i.e., until the negotiation has been performed with each of receiving electronic device 108-110).

Process for Acquiring Push Tokens and a Single Session Token

Figure 3:
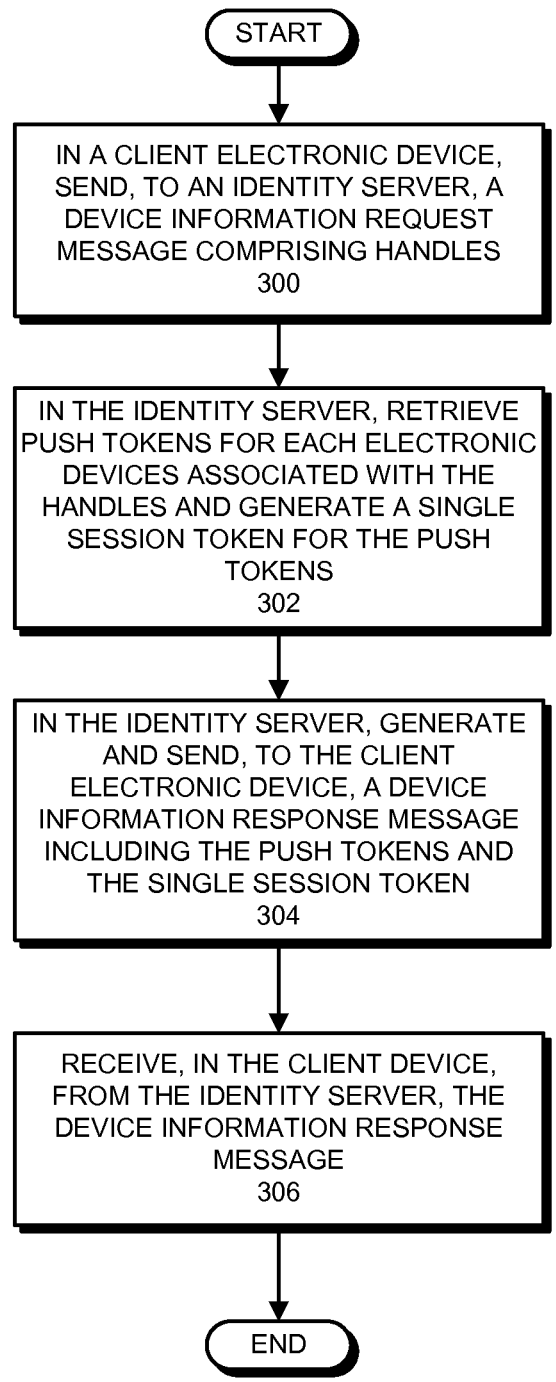
FIG. 3 presents a flowchart illustrating a process for acquiring push tokens and a corresponding single session token in accordance with some embodiments.

In some embodiments, to enable sending messages to two or more other electronic devices via message server 114, client electronic device 102 acquires push tokens for the two or more other electronic devices and a single session token. FIG. 3 presents a flowchart illustrating a process for acquiring the push tokens and a single session token in accordance with some embodiments. More specifically, during the process for shown in FIG. 3, client electronic device 102 requests the push tokens and the single session token from identity server 112. Note that the operations shown in FIG. 3 are presented as a general example of operations performed by some embodiments. The operations performed by other embodiments include different operations and/or operations that are performed in a different order. Additionally, although certain mechanisms are used in describing the operations (e.g., client electronic device 102, identity server 112, etc.), in some embodiments, other electronic devices perform the operations. Generally, the described embodiments include sufficient electronic devices to perform the operations herein described.

For FIG. 3, it is assumed that a user of client electronic device 102 has provided handles 118-120 and a payload (e.g., text, a photo, etc.) to a messaging application on client electronic device 102 to request that a message including the payload be sent to each electronic device associated with handles 118-120. Client electronic device 102 therefore performs operations to acquire a push token for each electronic device associated with handles 118-120 and a single session token.

For FIG. 3, operations involving two handles, handle 118-120, are described. However, in the described embodiments, client electronic device 102 and identity server 112 perform similar operations to acquire push tokens and a single session token associated with other numbers of handles, such as one handle or three or more handles.

The process shown in FIG. 3 starts when client electronic device 102 sends, to identity server 112, a device information request message comprising handles 118 and 120 (step 300). In some embodiments, the device information request message is formatted in accordance with a network protocol used to communicate between client electronic device 102 and identity server 112, with fields/portions in packets/messages/etc. including handles 118-120 and an indication that the message is requesting information for electronic devices associated with handles 118-120 (i.e., push tokens for electronic devices associated with handle 118-120 and a single session token).

Note that, for the operation in FIG. 3, the device information request includes multiple handles, but requests a single session token. The single session token is to be subsequently used by message server 114 to verify that client electronic device 102 is permitted to send messages via message server 114 to electronic devices associated with handles 118-120 using corresponding push tokens (i.e., one session token can be used for all messages to the electronic devices associated with handles 118-120).

Upon receiving the device information request message, identity server 112 acquires handles 118-120 from the device information request message and looks up handles 118-120 in a record that relates handles to associated electronic devices in identity server 112 (or in another electronic device such as a database server) (step 302). The lookup returns push tokens for receiving electronic devices 104-110 (recall that receiving electronic devices 104-106 are associated with handle 120 and receiving electronic device 108-110 are associated with handle 118). The push tokens include information identifying a corresponding one of receiving electronic devices 104-110 and enabling devices (e.g., message server 114) to find the corresponding one of receiving electronic devices 104-110 for sending messages (e.g., to route messages in a network via one or more network devices to the corresponding one of receiving electronic devices 104-110). From the push tokens and/or other information (e.g., handles 118-120, information about client electronic device 102, etc.), identity server 112 computes/generates the single session token (step 304). The single session token is a value that is subsequently used by message server 114 to establish/verify that client electronic device 102 is permitted to send a message to receiving electronic devices 104-110 (as described in more detail below).

Identity server 112 then generates and sends to client electronic device 102 a device information response message that comprises the push tokens for each electronic device associated with handles 118-120 and the single session token (step 304). In some embodiments, the device information response message is formatted in accordance with a network protocol used to communicate between client electronic device 102 and identity server 112, with fields/portions in packets/messages/etc. including the push tokens (e.g., a list of the push tokens for each electronic device associated with handles 118-120) and the single session token and an indication that the message is a response to a device information request message.

Client electronic device 102 next receives, from identity server 112, the device information response message comprising a push token for each electronic device associated with handles 118-120 (i.e., receiving electronic devices 104-110) and the single session token (step 306). Client electronic device 102 then processes the device information response message to acquire the push tokens and the single session token. Thus, after the process shown in FIG. 3 is complete, client electronic device 102 has a push token for each electronic device associated with handles 118-120 (i.e., receiving electronic devices 104-110) and the single session token, which are used in sending messages as described in FIG. 4.

Process for Sending Messages

Figure 4:
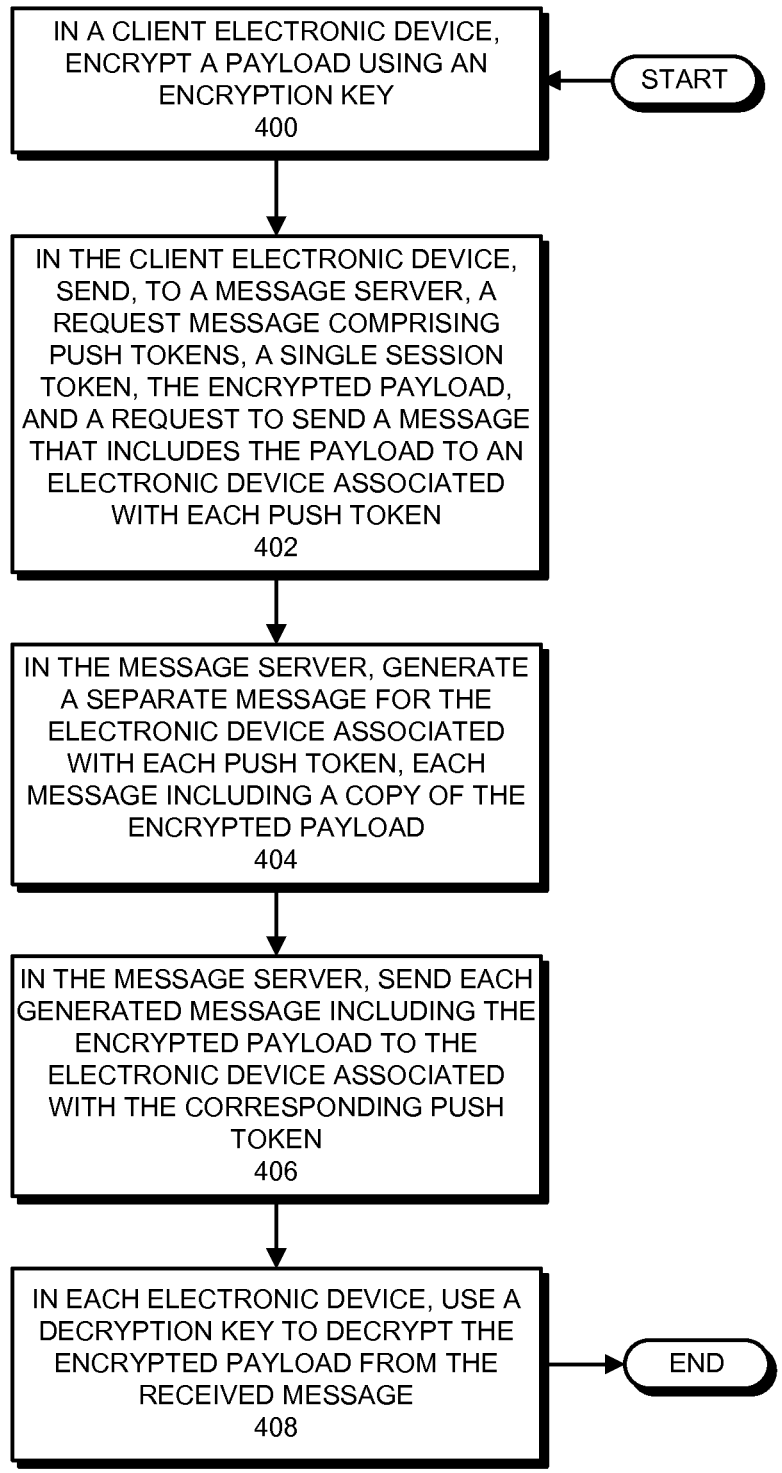
FIG. 4 presents a flowchart illustrating a process for sending messages to electronic devices via a message server using push tokens and a single session token in accordance with some embodiments.

In some embodiments, client electronic device 102 sends messages to two or more other electronic devices via message server 114 using push tokens for the two or more other electronic devices and a single session token. FIG. 4 presents a flowchart illustrating a process for sending messages to electronic devices via a message server using push tokens and a single session token in accordance with some embodiments. More specifically, during the process for shown in FIG. 4, client electronic device 102 sends, via message server 114, messages to each of receiving electronic devices 104-110 using push tokens for receiving electronic devices 104-110 and a single session token. Note that the operations shown in FIG. 4 are presented as a general example of operations performed by some embodiments. The operations performed by other embodiments include different operations and/or operations that are performed in a different order. Additionally, although certain mechanisms are used in describing the operations (e.g., client electronic device 102, message server 114, etc.), in some embodiments, other electronic devices perform the operations. Generally, the described embodiments include sufficient electronic devices to perform the operations herein described.

For FIG. 4, it is assumed that a user of client electronic device 102 has provided handles 118-120 and a payload (e.g., text, a photo, etc.) to a messaging application on client electronic device 102 to request that a message including the payload be sent to each electronic device associated with handles 118-120. It is also assumed that the process shown in FIG. 2 has been performed, so that client electronic device 102 is configured to use a single encryption key to encrypt the payload, and each of receiving electronic devices 104-110 has a corresponding decryption key for decrypting the encrypted payload. It is further assumed that the process shown in FIG. 3 has been performed, so that client electronic device 102 has a push token for each of receiving electronic devices 104-110 and a single session token that can be used to verify that client electronic device 102 is permitted to send messages to all of receiving electronic device 104-110.

For FIG. 4, operations involving two handles, handle 118-120, are described. However, in the described embodiments, client electronic device 102 and message server 114 perform similar operations to send messages using push tokens and a single session token associated with other numbers of handles, such as one handle or three or more handles.

The process shown in FIG. 4 starts when client electronic device 102 encrypts the payload using the encryption key for which each of receiving electronic device 104-110 have corresponding decryption keys (step 400). In other words, the encryption key that was negotiated as shown in FIG. 2. Generally, the encryption can be any form of key-based encryption that can be performed by client electronic device 102. (Note, however, that, in some embodiments, encryption is not performed; in these embodiments, client electronic device 102 may skip step 400.)

Client electronic device 102 then sends, to message server 114, a request message, the request message comprising the push tokens for receiving electronic devices 104-110, the single session token, the handles, the encrypted payload, and a request to send a message that includes the payload to an electronic device associated with each push token (step 402). In some embodiments, the request message is formatted in accordance with a network protocol used to communicate between client electronic device 102 and message server 114, with fields/portions in packets/messages/etc. including the push tokens (e.g., as a list of the push tokens), the single session token, the handles, the encrypted payload, and an indication that the message is a request to send a message that includes the payload to an electronic device associated with each push token.

Upon receiving the request message from client electronic device 102, message server 114 processes the request message, using the single session token to determine if client electronic device 102 is permitted to send messages to an electronic device associated with each push token (i.e., is permitted to cause message server 114 to fan out messages including the encrypted payload to each receiving electronic device 104-110). For example, message server 114 may use information from the request message (e.g., the handles, the push tokens, etc.) and/or other information to compute an expected value for the session token and compare the session token from request message with the expected value for the session token. In these embodiments, message server 114 determines that client electronic device 102 is permitted to send the message to an electronic device associated with each push token when the expected value for the session token matches the session token from request message. For this example, it is assumed that there is a match.

Message server 114 then generates a separate message for an electronic device associated with each push token, the message including a copy of the encrypted payload (step 404). Note that, in this operation, message server 114 performs the first part of the fan-out of the messages, i.e., from the original single request message with the payload, message server 114 generates a number of messages (one for each receiving electronic device 104-110), each of which includes a copy of the encrypted payload. Message server 114 then sends each generated message including the encrypted payload to the electronic device associated with a corresponding push token (i.e., to a corresponding one of receiving electronic devices 104-110) (step 406). More specifically, message server 114 processes each push token to determine the identity and location in the network of the receiving electronic device associated with the push token and then sends the message to the electronic device based on the determined identity and location.

Upon receiving the message from message server 114, each electronic device (i.e., each of receiving electronic device 104-110) uses the above-described decryption key to decrypt the encrypted payload of the message (step 408).

Messages Communicated Between Electronic Devices

Figure 5:
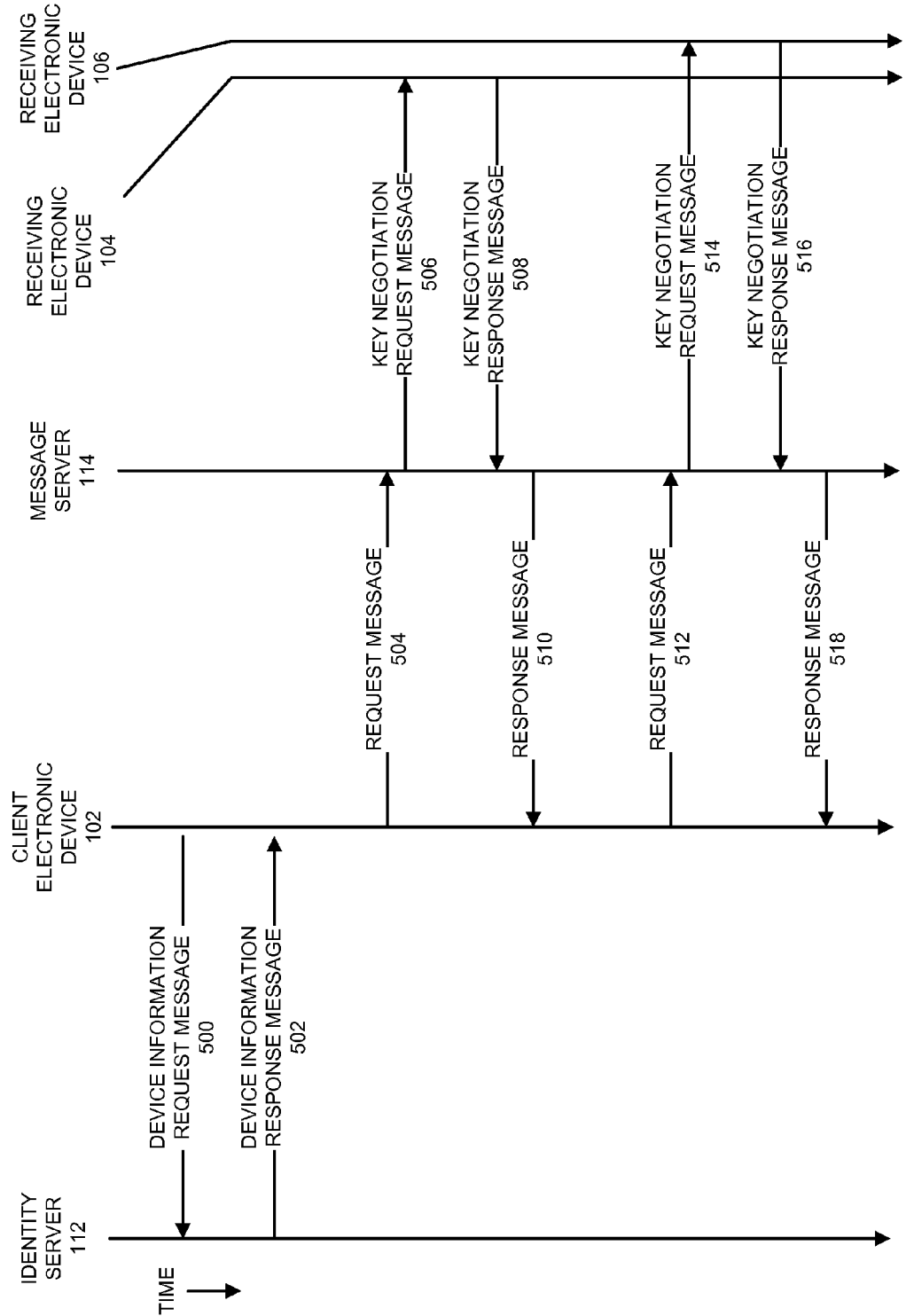
FIG. 5 presents a swim lane diagram illustrating messages exchanged between electronic devices in accordance with some embodiments.

FIG. 5 presents a swim lane diagram illustrating messages exchanged between electronic devices in accordance with some embodiments. More specifically, the messages are exchanged between identity server 112, client electronic device 102, message server 114, and receiving electronic devices 104-106 during a process for negotiating encryption keys in accordance with some embodiments. As can be seen in FIG. 5, the messages are exchanged over a period of time, with device information request message 500 occurring first in time and the messages lower in FIG. 5 occurring later in time. Although FIG. 5 is shown with messages exchanged in a particular order, in some embodiments, other messages are exchanged and/or messages are exchanged in a different order. Generally, the electronic devices in the described embodiments exchange sufficient messages to enable the operations herein described.

For the exchange of messages shown in FIG. 5, it is assumed that receiving electronic devices 104-106 are associated with the same handle (i.e., handle 120). Thus, identity server 112 returns push tokens, etc. for both of receiving electronic devices 104-106 in response to device information request message 500 (as described in more detail below). In addition, for the sake of clarity, key negotiation is shown occurring between client electronic device 102 and receiving electronic devices 104-106. However, in some embodiments, a key negotiation also occurs between client electronic device 102 and receiving electronic devices 108- 110, so that client electronic device 102 has a single encryption key that can be used to encrypt a payload that can be decrypted by all of receiving electronic devices 104-110.

The messages shown in FIG. 5 start when client electronic device 102 sends device information request message 500 to identity server 112. Device information request message includes handle 120 and an indication that client electronic device 102 is requesting information for sending messages to electronic devices associated with handle 120. In response, identity server 112 sends device information response message 502, which includes a push token and a corresponding session token for each of receiving electronic devices 104-106.

Client electronic device 102 then negotiates an encryption key with receiving electronic device 104. More specifically, client electronic device 102 sends, to message server 114, request message 504 to send a message (i.e., key negotiation request message 506) to receiving electronic device 104, request message 504 comprising the push token and the session token for receiving electronic device 104 and a key negotiation payload that includes a decryption key for decrypting encrypted messages sent from client electronic device 102. After verifying, using the session token, that client electronic device 102 is permitted to send messages to receiving electronic device 104, and based on the push token, message server 114 sends key negotiation request message 506 with the key negotiation payload to receiving electronic device 104.

In response (and upon determining that the decryption key is acceptable), receiving electronic device 104 sends key negotiation response message 508 to message server 114, key negotiation response message 508 comprising a push token for client electronic device 102 and the session token and an acknowledgement message indicating that the decryption key is accepted. After verifying, using the session token, that receiving electronic device 104 is permitted to send messages to client electronic device 102, and based on the push token, message server 114 sends response message 510 with the acknowledgement message to client electronic device 102. Upon receiving response message 510, client electronic device 102 determines that the decryption key has been accepted by receiving electronic device 104 and thus messages to receiving electronic device 104 can be encrypted using a corresponding key in client electronic device 102.

Client electronic device 102 then also negotiates the same encryption key with receiving electronic device 106 (i.e., the same encryption key that was negotiated for receiving electronic device 104). More specifically, client electronic device 102 sends, to message server 114, request message 512 to send a message (i.e., key negotiation request message 514) to receiving electronic device 106, request message 504 comprising the push token and the session token for receiving electronic device 106 and a key negotiation payload that includes a decryption key for decrypting encrypted messages sent from client electronic device 102. After verifying, using the session token, that client electronic device 102 is permitted to send messages to receiving electronic device 106, and based on the push token, message server 114 sends key negotiation request message 514 with the key negotiation payload to receiving electronic device 106.

In response (and upon determining that the decryption key is acceptable), receiving electronic device 106 sends key negotiation response message 516 to message server 114, key negotiation response message 516 comprising a push token for client electronic device 102 and the session token and an acknowledgement message indicating that the decryption key is accepted. After verifying, using the session token, that receiving electronic device 106 is permitted to send messages to client electronic device 102, and based on the push token, message server 114 sends response message 518 with the acknowledgement message to client electronic device 102. Upon receiving response message 518, client electronic device 102 determines that the decryption key has been accepted by receiving electronic device 106 and thus messages to receiving electronic device 106 can be encrypted using a corresponding key in client electronic device 102.

At the end of the exchange of messages shown in FIG. 5, receiving electronic device 104 and receiving electronic device 106 both have decryption keys for decrypting messages encrypted by client electronic device 102 using a same/single encryption key, and client electronic device 102 has been notified that using the same/single encryption key to encrypt messages for each of receiving electronic device 104-106 is acceptable. As described herein, this enables client electronic device 102 to encrypt a single payload that is subsequently used (by message server 114) to generate messages for both receiving electronic device 104 and receiving electronic device 106 using the encryption key.

Figure 6:
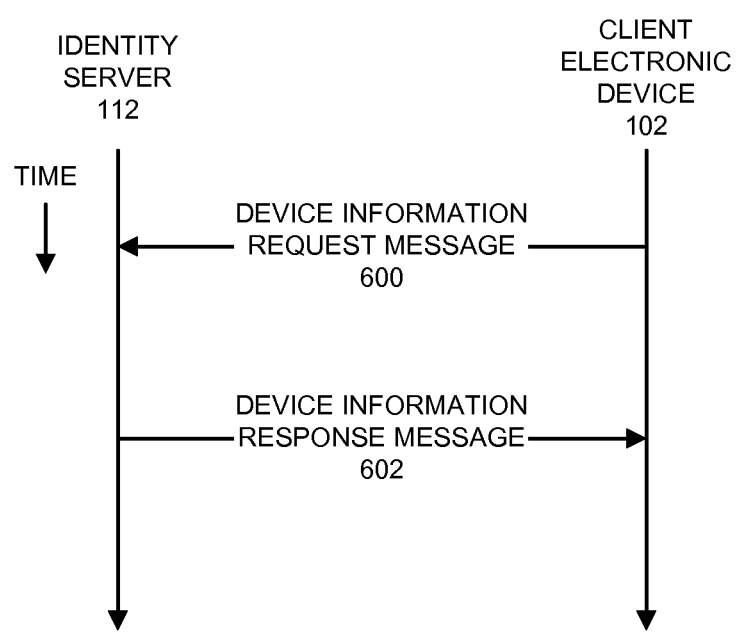
FIG. 6 presents a swim lane diagram illustrating messages exchanged between electronic devices in accordance with some embodiments.

FIG. 6 presents a swim lane diagram illustrating messages exchanged between electronic devices in accordance with some embodiments. More specifically, the messages are exchanged between identity server 112 and client electronic device 102 during a process for acquiring push tokens and a single session token (to be subsequently used to send messages to receiving electronic devices 104-110) in accordance with some embodiments. As can be seen in FIG. 6, the messages are exchanged over a period of time, with device information request message 600 occurring first in time and the messages lower in FIG. 6 occurring later in time. Although FIG. 6 is shown with messages exchanged in a particular order, in some embodiments, other messages are exchanged and/or messages are exchanged in a different order. Generally, the electronic devices in the described embodiments exchange sufficient messages to enable the operations herein described.

For the exchange of messages shown in FIG. 6, it is assumed that both of receiving electronic devices 104-106 are associated with handle 120 and both of receiving electronic devices 108-110 are associated with handle 118 (e.g., 408-555-1212). Thus, the same user and/or user account is associated with receiving electronic device 104-106 and receiving electronic device 108-110, respectively. It is further assumed that a user has provided handles 118-120 and a payload to a messaging application on client electronic device 102 to request that a message including the payload be sent to electronic devices associated with handles 118- 120.

The messages shown in FIG. 6 start when client electronic device 102 sends device information request message 600 to identity server 112. Device information request message includes each of handles 118-120 and an indication that client electronic device 102 is requesting information for sending messages to electronic devices associated with handles 118-120. In response, identity server 112 sends device information response message 602, which includes push tokens for each of receiving electronic devices 104-110 and a single session token to be used for communicating with receiving electronic devices 104-110. To generate the device information response message, identity server 112 looks up/acquires the push tokens and generates/computes the single session token based on the push token and/or other information (handles 118-120, information for client electronic device 102, etc.).

At the end of the exchange of messages shown in FIG. 6, client electronic device 102 has (after sending the one/single device information request message 600 with handles 118-120) push tokens for each of receiving electronic devices 104-110 and a single session token. The multiple push tokens and the single session token are subsequently used for sending messages to receiving electronic devices 104-110 as herein described.

Figure 7:
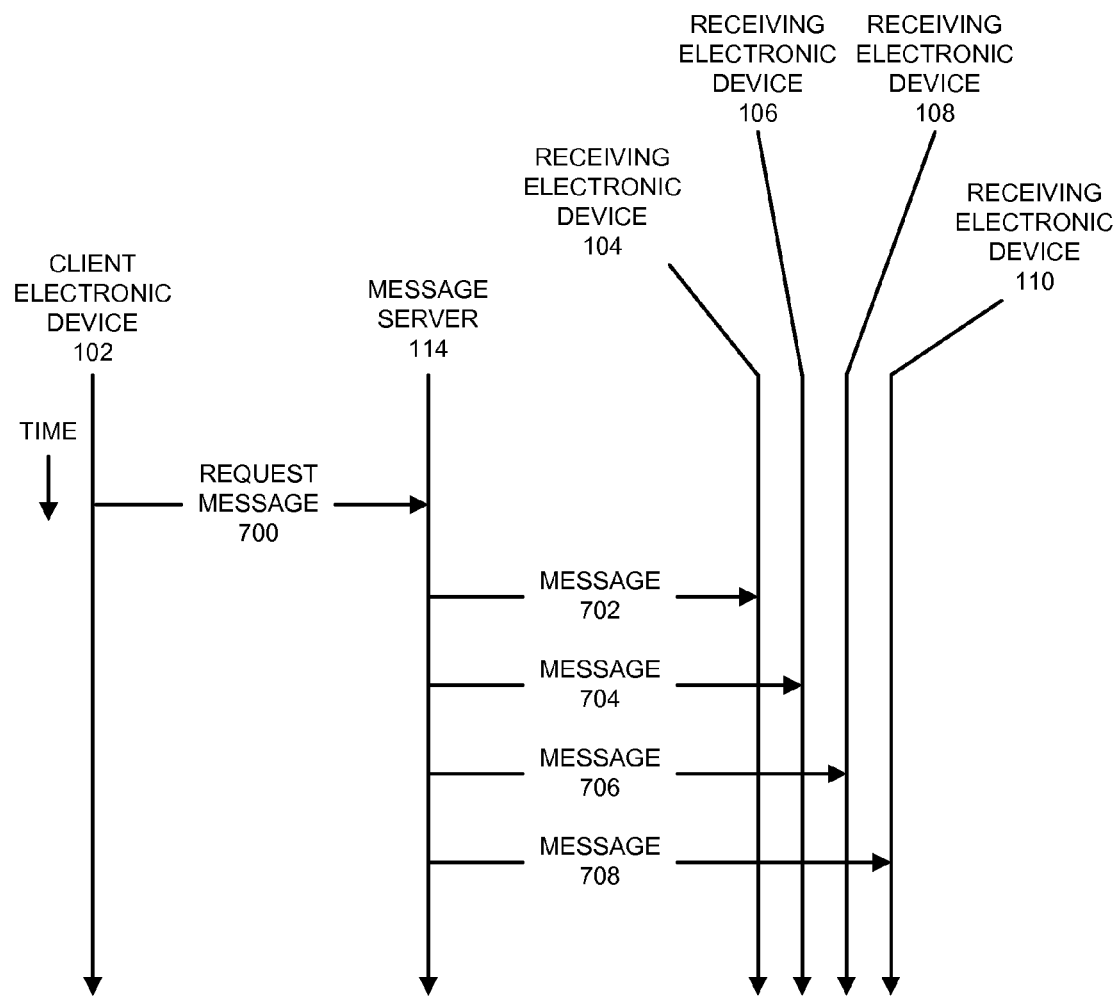
FIG. 7 presents a swim lane diagram illustrating messages sent to electronic devices in accordance with some embodiments.

FIG. 7 presents a swim lane diagram illustrating messages sent to electronic devices in accordance with some embodiments. More specifically, the messages are sent from client electronic device 102 to message server 114 and from message server 114 to each of receiving electronic devices 104-110 during a process for sending a message from client electronic device 102 to receiving electronic devices 104-110 in accordance with some embodiments. As can be seen in FIG. 7, the messages are sent over a period of time, with request message 700 sent first in time and the messages lower in FIG. 7 sent later in time. Although FIG. 7 is shown with messages sent in a particular order, in some embodiments, other messages are sent and/or messages are sent in a different order. Generally, the electronic devices in the described embodiments send sufficient messages to enable the operations herein described.

For the sending of messages shown in FIG. 7, it is assumed that client electronic device 102 has (after sending the single device information request message 600 with handles 118-120 as described above for FIG. 6) push tokens for each of receiving electronic devices 104-110 and a single session token. It is further assumed that receiving electronic devices 104-110 have decryption keys for decrypting messages encrypted using a same encryption key by client electronic device 102, and client electronic device 102 has been notified that using the same encryption key to encrypt messages to all of receiving electronic devices 104-110 is acceptable (as described above for FIG. 5).

The messages shown in FIG. 7 start when client electronic device 102 sends request message 700 to identity server 112. Request message includes the handles, the push tokens for each of receiving electronic devices 104-110, the single session token, a payload (e.g., text, a video file, etc.), and an indication that client electronic device 102 is requesting that message server 114 send corresponding messages with the payload to each electronic device represented by the push tokens. In some embodiments, before including the above-described payload in request message 700, client electronic device 102 encrypts the payload using the encryption key for which each of receiving electronic device 104-110 have corresponding decryption keys. Note that, in these embodiments, request message 700 includes a single copy of the payload, which was encrypted using the encryption key.

Upon receiving request message 700, message server 114 uses the single session token from request message 700 to verify that client electronic device 102 is permitted to send messages to each/all of receiving electronic devices 104-110. For example, in some embodiments, message server 114 uses information from request message 700 (e.g., the handles, the push tokens, etc.) and/or other information to compute an expected value for the single session token and compares the session token from request message 700 with the expected value for the session token. In these embodiments, message server 114 determines that client electronic device 102 is permitted to send the messages when the expected value for the session token matches the session token from request message 700. For this example, it is assumed that there is a match and thus message server 114 proceeds with sending messages 702-708 as described below.

Message server 114 next generates message 702 with a copy of the payload from request message 700 and uses the push token for receiving electronic device 104 to send message 702 to receiving electronic device 104. More specifically, message server 114 extracts, from the push token, information that can be used to determine a network location for receiving electronic device 104 (i.e., to determine gateways, couriers, etc. to which message 702 is to be routed to reach receiving electronic device 104). Message server 114 also performs a similar operation for each of receiving electronic devices 106-110, generating messages 704-708, each with a copy of the payload from request message 700, and using the push token for each of receiving electronic devices 106-110 to send messages 704-708, respectively, to receiving electronic devices 106-110.

As described above, the payload of messages 702-708 was encrypted by client electronic device 102 before client electronic device 102 sent request message 700 to message server 114. Thus, each of receiving electronic device 104-110 uses the corresponding decryption key to decrypt the payload of message 702-708, respectively.

Note that, after the messages shown in FIG. 7 are received, each of receiving electronic devices 104-110 has the payload originally sent to message server 114 as a single payload in request message 700. This is true because message server 114 "fanned-out" request message 700 (or, more specifically, the payload included therein) in messages to each of receiving electronic devices 104-110 based on the multiple push tokens included in request message 700. In addition, client electronic device 102 was able, due to each of receiving electronic device 104-110 having a corresponding decryption key, include a single copy of the encrypted payload in request message 700 (note that, using existing per-electronic-device encryption, client electronic device 102 would be required to separately encrypt a specific payload for each of receiving electronic device 104-110).

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
by a client electronic device, performing operations for:
sending, to an identity server, a device information request message comprising one or more handles;
receiving, from the identity server, in response to the device information request message, a device information response message comprising a push token for each of one or more receiving electronic devices associated with each of the one or more handles and a single session token, wherein the single session token, generated from the push token, generates a value that is used by a message server to verify that the client electronic device is permitted to send messages to a corresponding one of receiving electronic devices; and sending a single request message to a message server, the single request message comprising the push tokens, the session token, and a payload, wherein the single request message is configured to cause the message server to, based on the push tokens and the session token, send a corresponding message that includes a copy of the payload to each of the one or more receiving electronic devices.

2. The method of claim 1, further comprising:

in the client electronic device, before sending the single request message to the message server, performing operations for:

using an encryption key, encrypting the payload.

3. The method of claim 1, wherein the single request message is further configured to cause the message server to, based on the push tokens and the session token, verify that the client electronic device is permitted to send the corresponding message that includes the copy of the payload to each of the one or more receiving electronic devices.

4. The method of claim 2, further comprising:

in the client electronic device, performing operations for:

negotiating the encryption key with the one or more receiving electronic devices by, for each of the one or more receiving electronic devices:

sending, to the receiving electronic device, a request to use a corresponding decryption key to decrypt messages sent to the receiving electronic device from the client electronic device; and receiving a response from the receiving electronic device indicating acceptance of the decryption key.

5. A method, comprising:

in a message server, performing operations for:

receiving, from a client electronic device, a single request message, the single request message comprising a push token for each of one or more receiving electronic devices, a single session token, and a payload, wherein the single session token, generated from the push token, generates a value that is used by the message server to verify that the client electronic device is permitted to send messages to a corresponding one of receiving electronic devices;

based on the session token, verifying that a corresponding message comprising a copy of the payload can be sent to each of the one or more receiving electronic devices; and using each push token to send a message comprising a copy of the payload to a corresponding one of the one or more receiving electronic devices.

6. The method of claim 5, wherein verifying that a corresponding message comprising a copy of the payload can be sent to each of the one or more receiving electronic devices comprises:

in the message server, performing operations for:

computing an expected value for the session token; and when the session token is equal to the expected value for the session token, verifying that a corresponding message comprising a copy of the payload can be sent to each of the one or more receiving electronic devices.

7. The method of claim 5, wherein using each push token to send the message comprising the copy of the payload to the corresponding one of the one or more receiving electronic devices comprises:

in the message server, performing operations for:

generating a message for each of the one or more receiving electronic devices, each of the messages comprising a copy of the payload; and based on the push token for each of the one or more receiving electronic devices, transmitting a corresponding message to each of the one or more receiving electronic devices.

8. A method, comprising:

in an identity server, performing operations for:

receiving, from a client electronic device, a device information request message comprising one or more handles;

acquiring a push token for each of one or more receiving electronic devices associated with each of the one or more handles;

generating a single session token associated with the one or more push tokens, wherein the single session token, generated from the push token, generates a value that is used by a message server to verify that the client electronic device is permitted to send messages to a corresponding one of receiving electronic devices; and sending, to the client electronic device, a device information response message comprising the push tokens and the single session token.

9. A client electronic device, comprising:

one or more processors; and a non-transitory computer-readable medium including one or more sequences of instructions that, when executed by one or more processors, cause the client electronic device to perform operations comprising:

sending, to an identity server, a device information request message comprising one or more handles;

receiving, from the identity server, in response to the device information request message, a device information response message comprising a push token for each of one or more receiving electronic devices associated with each of the one or more handles and a single session token, wherein the single session token, generated from the push token, generates a value that is used by a message server to verify that the client electronic device is permitted to send messages to a corresponding one of receiving electronic devices; and sending a single request message to a message server, the single request message comprising the push tokens, the session token, and a payload, wherein the single request message is configured to cause the message server to, based on the push tokens and the session token, send a corresponding message that includes a copy of the payload to each of the one or more receiving electronic devices.

10. The client electronic device of claim 9, wherein the instructions cause:

in the client electronic device, before sending the single request message to the message server, performing operations for:

using an encryption key, encrypting the payload.

11. The client electronic device of claim 9, wherein the single request message is further configured to cause the message server to, based on the push tokens and the session token, verify that the client electronic device is permitted to send the corresponding message that includes the copy of the payload to each of the one or more receiving electronic devices.

12. The client electronic device of claim 10, wherein the instructions cause:

in the client electronic device, performing operations for:

negotiating the encryption key with the one or more receiving electronic devices by, for each of the one or more receiving electronic devices:

sending, to the receiving electronic device, a request to use a corresponding decryption key to decrypt messages sent to the receiving electronic device from the client electronic device; and receiving a response from the receiving electronic device indicating acceptance of the decryption key.

13. A message server, comprising:

one or more processors; and a non-transitory computer-readable medium including one or more sequences of instructions that, when executed by one or more processors, cause the message server to perform operations comprising:

receiving, from a client electronic device, a single request message, the single request message comprising a push token for each of one or more receiving electronic devices, a single session token, and a payload, wherein the single session token, generated from the push token, generates a value that is used by the message server to verify that the client electronic device is permitted to send messages to a corresponding one of receiving electronic devices;

based on the session token, verifying that a corresponding message comprising a copy of the payload can be sent to each of the one or more receiving electronic devices; and using each push token to send a message comprising a copy of the payload to a corresponding one of the one or more receiving electronic devices.

14. The message server of claim 13, wherein the instructions that cause verifying that a corresponding message comprising a copy of the payload can be sent to each of the one or more receiving electronic devices comprise instructions that cause:

in the message server, performing operations for:

computing an expected value for the session token; and when the session token is equal to the expected value for the session token, verifying that a corresponding message comprising a copy of the payload can be sent to each of the one or more receiving electronic devices.

15. The message server of claim 13, wherein the instructions that cause using each push token to send the message comprising the copy of the payload to the corresponding one of the one or more receiving electronic devices comprise instructions that cause:

in the message server, performing operations for:

generating a message for each of the one or more receiving electronic devices, each of the messages comprising a copy of the payload; and based on the push token for each of the one or more receiving electronic devices, transmitting a corresponding message to each of the one or more receiving electronic devices.

16. A identity server, comprising:

one or more processors; and a non-transitory computer-readable medium including one or more sequences of instructions that, when executed by one or more processors, causes:

receiving, from a client electronic device, a device information request message comprising one or more handles;

acquiring a push token for each of one or more receiving electronic devices associated with each of the one or more handles;

generating a single session token associated with the one or more push tokens, wherein the single session token, generated from the push token, generates a value that is used by a message server to verify that the client electronic device is permitted to send messages to a corresponding one of receiving electronic devices; and sending, to the client electronic device, a device information response message comprising the push tokens and the single session token.

17. A non-transitory computer-readable medium including one or more sequences of instructions that, when executed by one or more processors, cause a client electronic device to perform operations comprising:

sending, to an identity server, a device information request message comprising one or more handles;

receiving, from the identity server, in response to the device information request message, a device information response message comprising a push token for each of one or more receiving electronic devices associated with each of the one or more handles and a single session token, wherein the single session token, generated from the push token, generates a value that is used by a message server to verify that the client electronic device is permitted to send messages to a corresponding one of receiving electronic devices; and sending a single request message to a message server, the single request message comprising the push tokens, the session token, and a payload, wherein the single request message is configured to cause the message server to, based on the push tokens and the session token, send a corresponding message that includes a copy of the payload to each of the one or more receiving electronic devices.

18. The non-transitory computer-readable medium of claim 17, wherein the instructions cause:

in the client electronic device, before sending the single request message to the message server, performing operations for:

using an encryption key, encrypting the payload.

19. The non-transitory computer-readable medium of claim 18, wherein the instructions cause:

in the client electronic device, performing operations for:

negotiating the encryption key with the one or more receiving electronic devices by, for each of the one or more receiving electronic devices:

sending, to the receiving electronic device, a request to use a corresponding decryption key to decrypt messages sent to the receiving electronic device from the client electronic device; and receiving a response from the receiving electronic device indicating acceptance of the decryption key.

20. The non-transitory computer-readable medium of claim 17, wherein the single request message is further configured to cause the message server to, based on the push tokens and the session token, verify that the client electronic device is permitted to send the corresponding message that includes the copy of the payload to each of the one or more receiving electronic devices.

21. A non-transitory computer-readable medium including one or more sequences of instructions that, when executed by one or more processors, cause a message server to perform operations comprising:

receiving, from a client electronic device, a single request message, the single request message comprising a push token for each of one or more receiving electronic devices, a single session token, and a payload, wherein the single session token, generated from the push token, generates a value that is used by the message server to verify that the client electronic device is permitted to send messages to a corresponding one of receiving electronic devices;

based on the session token, verifying that a corresponding message comprising a copy of the payload can be sent to each of the one or more receiving electronic devices; and using each push token to send a message comprising a copy of the payload to a corresponding one of the one or more receiving electronic devices.

22. The non-transitory computer-readable medium of claim 21, wherein the instructions that cause verifying that a corresponding message comprising a copy of the payload can be sent to each of the one or more receiving electronic devices comprise instructions that cause:

in the message server, performing operations for:

computing an expected value for the session token; and when the session token is equal to the expected value for the session token, verifying that a corresponding message comprising a copy of the payload can be sent to each of the one or more receiving electronic devices.

23. The non-transitory computer-readable medium of claim 21, wherein the instructions that cause using each push token to send the message comprising the copy of the payload to the corresponding one of the one or more receiving electronic devices comprise instructions that cause:

in the message server, performing operations for:

generating a message for each of the one or more receiving electronic devices, each of the messages comprising a copy of the payload; and based on the push token for each of the one or more receiving electronic devices, transmitting a corresponding message to each of the one or more receiving electronic devices.

24. A non-transitory computer-readable medium including one or more sequences of instructions that, when executed by one or more processors, cause an identify server to perform operations comprising:

receiving, from a client electronic device, a device information request message comprising one or more handles;

acquiring a push token for each of one or more receiving electronic devices associated with each of the one or more handles;

generating a single session token associated with the one or more push tokens, wherein the single session token, generated from the push token, generates a value that is used by a message server to verify that the client electronic device is permitted to send messages to a corresponding one of receiving electronic devices; and sending, to the client electronic device, a device information response message comprising the push tokens and the single session token.

* * * * *